(12) United States Patent
Ekern et al.

(10) Patent No.: US 6,840,576 B2
(45) Date of Patent: *Jan. 11, 2005

(54) VENTILATED SEAT

(75) Inventors: David F. Ekern, Plymouth, MI (US); Ronald G. Bedro, Plymouth, MI (US)

(73) Assignee: Johnson Controls Technology Company, Holland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/445,506

(22) Filed: May 27, 2003

(65) Prior Publication Data
US 2003/0197404 A1 Oct. 23, 2003

Related U.S. Application Data

(63) Continuation of application No. 09/755,506, filed on Jan. 5, 2001, now Pat. No. 6,629,724.

(51) Int. Cl.$^7$ ................................................ A47C 7/74
(52) U.S. Cl. ............................ 297/180.14; 297/180.11; 297/452.46; 297/452.47
(58) Field of Search ......................... 297/180.1, 180.11, 297/180.13, 180.14, 452.46, 452.47

(56) References Cited

U.S. PATENT DOCUMENTS

| | | |
|---|---|---|
| 1,811,829 A | 6/1931 | Folberth et al. |
| 2,722,266 A | 11/1955 | Kersten |
| 2,726,658 A | 12/1955 | Chessey |
| 2,912,832 A | 11/1959 | Clark |
| 3,097,505 A | 7/1963 | Smith |
| 4,719,764 A | 1/1988 | Cook |
| 4,852,934 A | 8/1989 | Yasuda et al. |
| 4,946,220 A * | 8/1990 | Wyon et al. ........... 297/180.13 |
| 5,002,336 A * | 3/1991 | Feher .................... 297/180.13 |
| 5,138,851 A | 8/1992 | Mardikian |
| 5,403,065 A * | 4/1995 | Callerio ................. 297/180.11 |
| 6,511,125 B1 * | 1/2003 | Gendron ........... 297/180.11 X |
| 6,578,910 B2 | 7/2003 | Andersson et al. |

FOREIGN PATENT DOCUMENTS

| | | |
|---|---|---|
| EP | 1075984 | 7/2000 |
| EP | 1 123 834 A1 | 8/2001 |

* cited by examiner

Primary Examiner—Anthony D. Barfield
(74) Attorney, Agent, or Firm—Foley & Lardner LLP

(57) ABSTRACT

A ventilated vehicle seat includes a first portion and a tongue portion. The first portion includes a porous upper surface layer, a non-porous first inner layer that is adjacent to the upper surface layer and that includes ventilation holes, a non-porous lower surface layer, and an expanded spacer layer between the non-porous layers that provides an air space. The tongue portion includes a tongue that is integrally-formed with the first portion. The tongue extends from the edge of the first portion and includes an opening in one of the non-porous layers. The opening provides access to the air space within the expanded spacer layer.

34 Claims, 4 Drawing Sheets

VENTILATED SEAT

CROSS REFERENCE TO RELATED APPLICATIONS

The present application is a continuation of U.S. application Ser. No. 09/755,506, filed by Ekern et al. on Jan. 5, 2001, now U.S. Pat. No. 6,629,724, entitled "Ventilated Seat," which is incorporated herein by reference.

FIELD OF THE INVENTION

This invention generally relates to a ventilated seat for a vehicle. More specifically, this invention relates to a portable ventilated seat for a vehicle including a top pad assembly that forms at least a seat cushion, and preferably a seat cushion and seat back, suitable for use with any vehicle seat. Air passes through the seating surface of the pad assembly by suction or forced air flow.

BACKGROUND OF THE INVENTION

When driving a car in hot weather, occupants may experience excessive sweating from contact with the vehicle seat, because the seat prevents or blocks the body's ability to radiate excess heat. To reduce sweating, the occupant may roll down the window of the vehicle, or if provided, turn on the air conditioning to allow cool air to pass through the vehicle interior. A disadvantage of both solutions is that areas of the occupant's body are in contact with the vehicle seat preventing any cooling airflow from reaching those areas. In cold weather, the reverse phenomena may occur, i.e., cold seats may be difficult to warm quickly due to occupant contact with the seat.

Seat covers or pads designed for placement on top of vehicle seats are known. In some cases, these seat covers or pads are made of fashion based materials that allow some air to flow therethrough, thus allowing the occupant to more readily emit heat radiated from the body during hot days or long drives and vice versa in cold weather. These devices have been made from wooden rollers, springs covered with porous sheet material and the like. A disadvantage of these seat covers is that they rely only on passive air flow and thus they do not fully resolve the issues discussed above.

SUMMARY OF THE INVENTION

Accordingly, this invention provides for a portable ventilated seat pad that overcomes the problems and disadvantages discussed above. The invention provides a non-rigid pad assembly for cooling or heating an occupant primarily through evaporative cooling or forced air heating. The invention further provides, in its most preferred embodiment, a range of different air flows, e.g., low/medium/high, by a switch coupled to a fan.

Briefly, the invention is a portable ventilated seat pad assembly that lays on an existing seat in a vehicle. This non-porous pad has an upper surface layer formed of a porous material, a lower surface layer and two inner layers. The first inner layer is preferably formed of a non-porous material which confronts the upper surface. This non-porous layer is provided with ventilation holes for allowing air to flow through the upper surface layer. The second inner layer is a porous material and is positioned between the first inner layer and the lower surface layer. This porous layer is preferably a spring-like cushion having top and bottom netting and an interior consisting of rigidized threads extending between the top and bottom netting.

A fan (vacuum or forced air) is connected to an extension or tongue provided on a bag that is formed by the first inner layer and the lower surface layer and air moves through the second inner layer into or out of the ventilation holes provided in the first inner layer and hence through the upper surface layer. A vacuum would draw interior air from the vehicle through the occupant's clothes, through the ventilated seat pad assembly and out through the vacuum device, or the reverse would occur if it were desired to use forced air to heat or cool the air leaving the pad. The pad assembly of the present invention allows the occupant's perspiration to evaporate efficiently from his skin and clothing or to warm or cool the occupant more quickly than has previously been possible. Preferably, the occupant can adjust the airflow rate through the pad to maximize comfort at any time.

BRIEF DESCRIPTION OF THE DRAWINGS

Further features and advantages of the invention will become apparent from the following discussion and accompanying drawings, in which.

In the various FIGURES, like reference numerals are used to denote like components.

DETAILED DESCRIPTION OF THE PREFERRED EMBODIMENTS

The following description of the preferred embodiment is merely exemplary in nature and is in no way intended to limit the invention or its application or uses.

Figure 1:
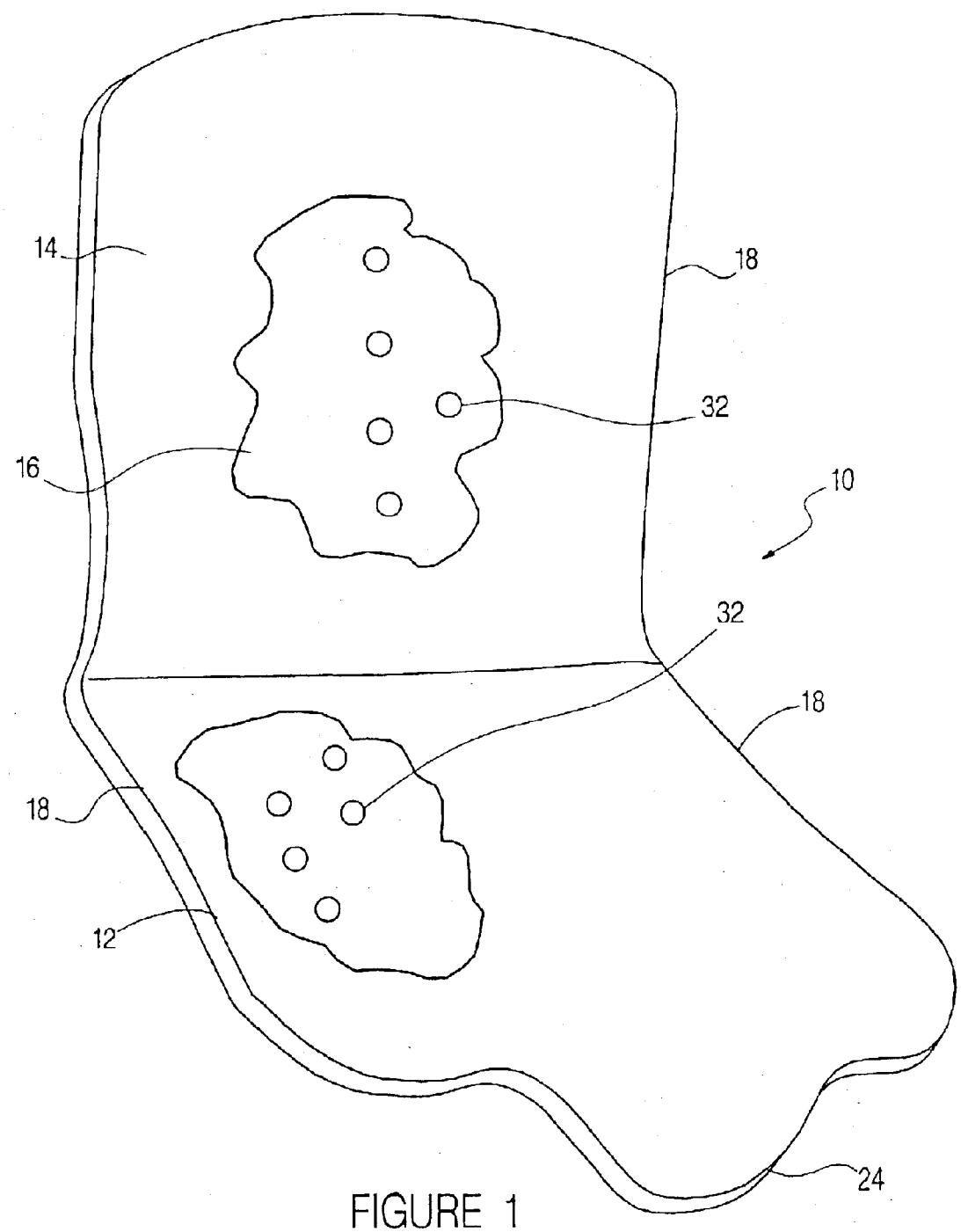
FIG. 1 is a perspective view of the ventilated pad of the preferred embodiment of the invention with a cutaway of the upper surface layer to illustrate a pattern of ventilation holes in the first inner layer.
Figure 4:
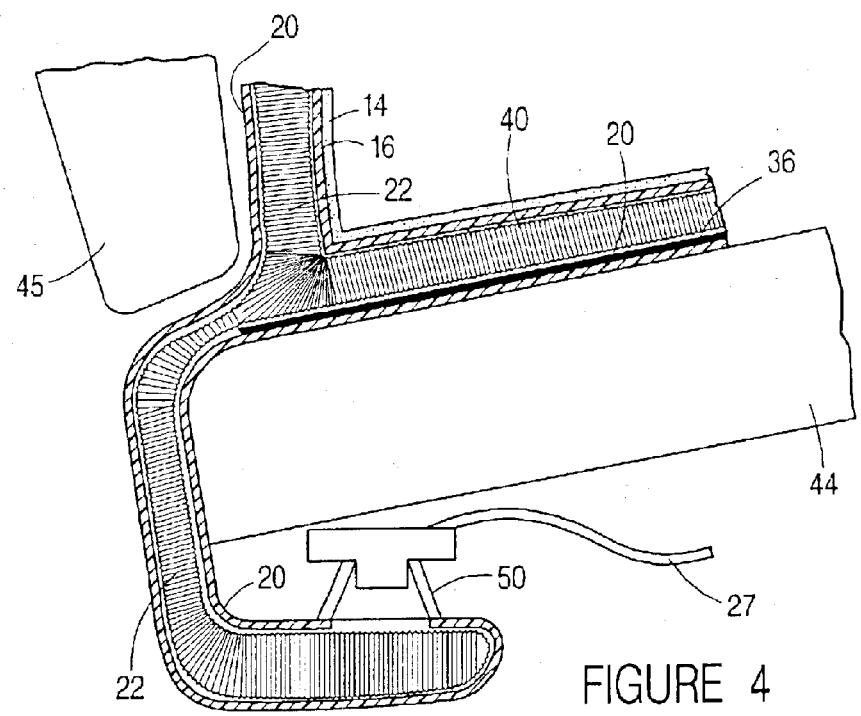
FIG. 4 is a partial cross-sectional view of the ventilated pad showing an alternative location for the fan and fan coupling, i.e., through the seat bite line.

As shown in FIG. 1, the portable ventilated seat pad assembly 10 of the preferred embodiment of the invention includes a pad 12 which lays on top of a vehicle seat 44, 45 (FIG. 4).

Figure 2:
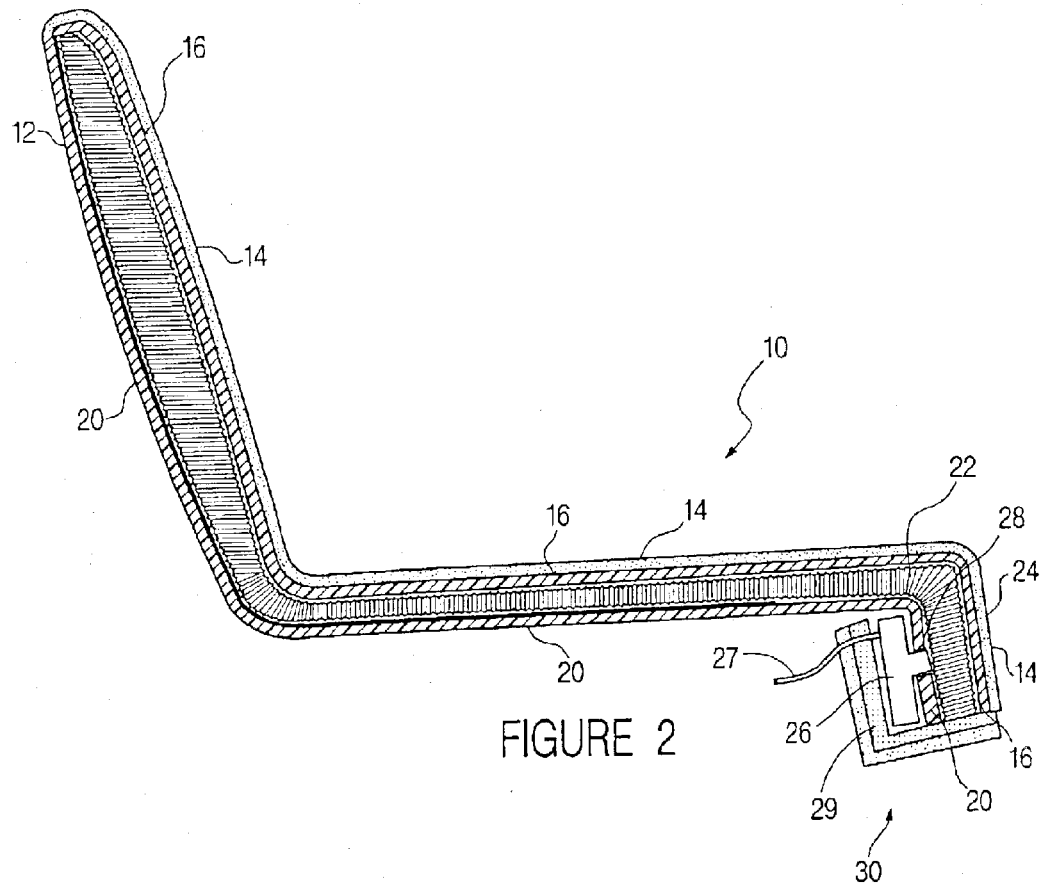
FIG. 2 is a cross-sectional side view of the pad of the preferred embodiment showing by arrows the airflow of the ventilated pad through a fan.
Figure 3:
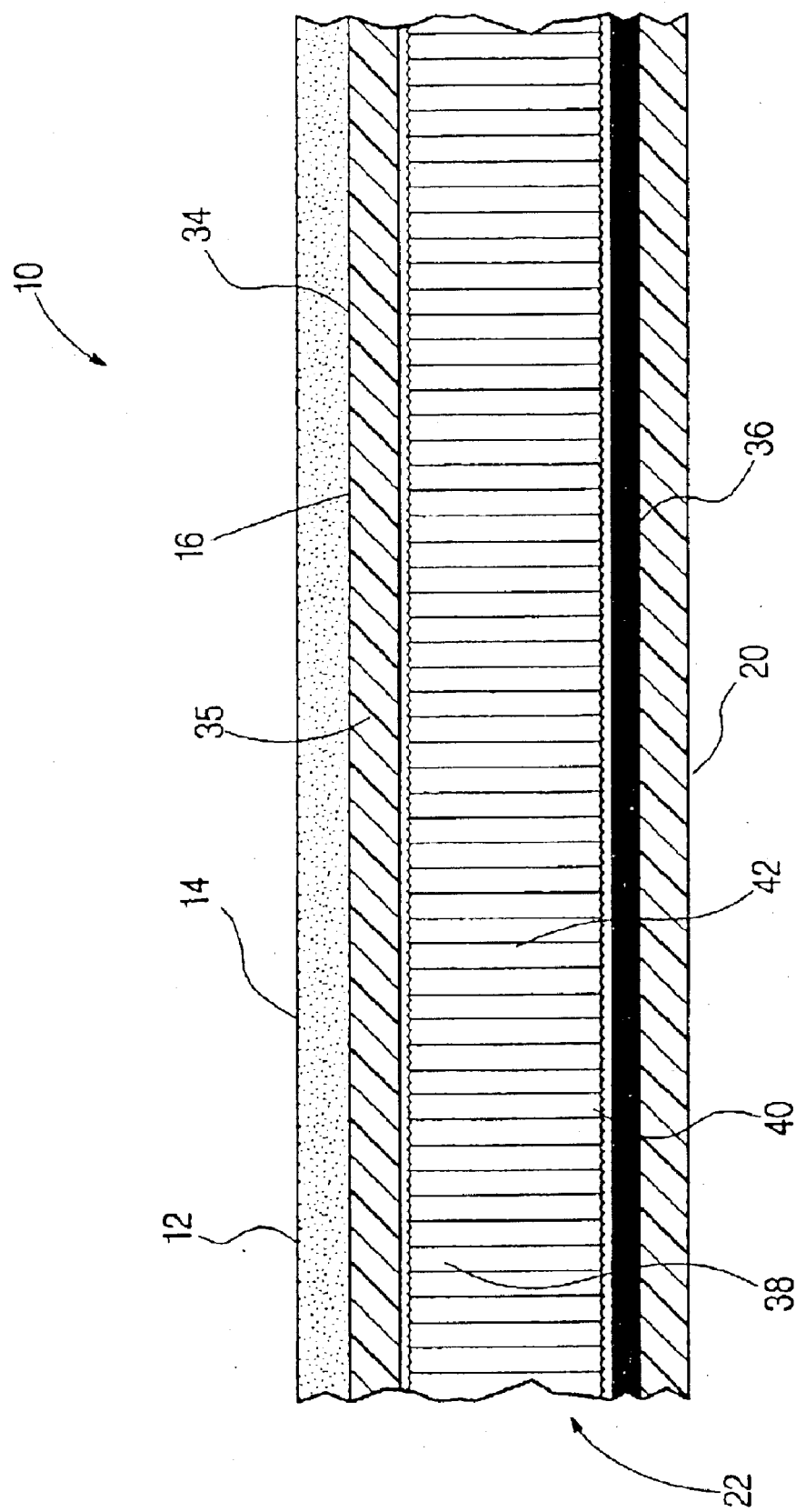
FIG. 3 is a side sectional view of the pad of the preferred embodiment.

As best shown in FIGS. 2 and 3, the pad 12 includes an upper surface layer 14. The upper surface area 14 is preferably formed of a porous material, e.g., fabric or perforated leather. A first inner layer 16 is formed of a non-porous material, as is a lower surface layer 20. Upper surface layer 14, first inner layer 16, and lower surface layer 20 are attached, for example, by sewing 18 (FIG. 1), forming an air impermeable bag between the first inner layer 16 and the lower surface layer 20.

Figure 2A:
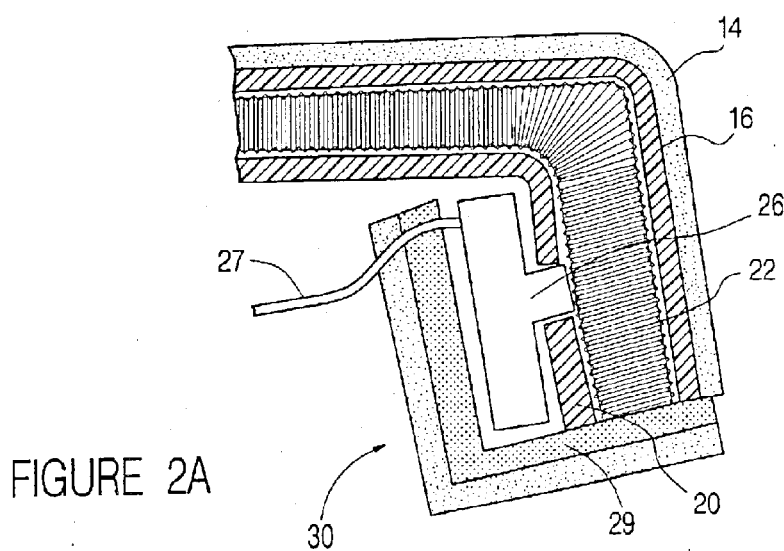
FIG. 2A is an exploded view of the fan area of FIG. 2 and illustrating a noise reduction layer about the fan.

An expanded, porous second inner layer 22 is located between non-porous layers 16, 20 and is preferably 5900 series spacer fabric available from Mueller Textil located at Wiehl, Germany. It will be described in greater detail in connection with FIGS. 2, 2A and 3. Extending forwardly from the pad 12, is tongue 24 (FIGS. 1 and 2) coupled to a fan 26 powered by wire 27. The fan 26 is coupled to the air space within layer 22. FIGS. 2 and 2A show fan 26 coupled to an opening 28 in layer 20. Tongue 24 can form a pocket-like structure 30 to support fan 26. In the illustrated embodiment, a layer of any suitable sound-absorbing material 29 surrounds fan 26.

Referring to FIG. 1. tongue 24 extends from the front side or edge of pad 12 and is an extension of the different layers of pad 12 (e.g. tongue 24 is integrally-formed with the rest of pad 12). Although the tongue is illustrated in FIG. 1 as extending from the front side of pad 12, the tongue may alternatively extend from other sides of the pad. In one embodiment, the width of the side from which tongue 24 extends is greater than the width of tongue 24. For example, according to the embodiment illustrated in FIG. 1, the front side of pad 12 has a width that extends approximately between the left and right side of pad 12, which is greater than the width of tongue 24.

Figure 5:
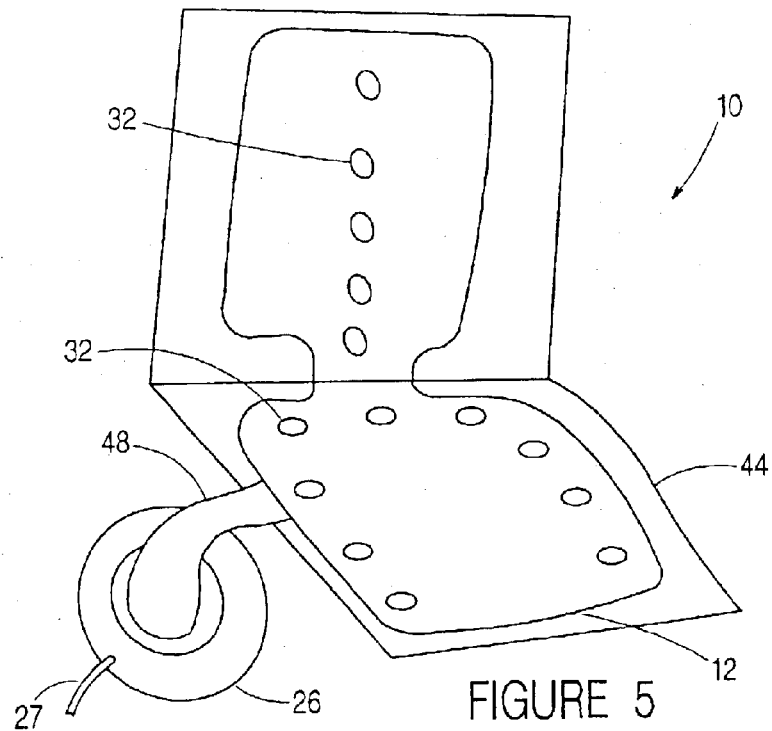
FIG. 5 is a perspective view of a ventilated pad arrangement showing a side connection of the fan, e.g., between an inboard bolster and center console of a vehicle.

With reference to FIGS. 1, 3 and 5, ventilation holes 32 are provided in first inner layer 16. Ventilation holes 32 are preferably positioned in a U-shape along the lower half of pad 12 to provide airflow about the thighs and seat of the occupant sitting on the pad 12. Ventilation holes 32 provided in the upper seating area of the pad 12 are linear to provide good suction or forced airflow to assist in the elimination or reduction of sweating of the occupant's back. In a preferred embodiment, non-porous material 16 is formed of a laminated continuous resin-film layer 34 to a foam layer 35, wherein the continuous layer 34 provides support about ventilation holes 32, thereby preventing tearing of them when the occupant sits on pad 12.

Lower surface layer 20 may be provided with a tacky interior layer 36 (e.g. an adhesive) for fixing the position of the porous material 22 between layers 16 and 20 and preventing slipping thereof while allowing airflow through the pad 12. Alternatively, the porous material 22 can be stitched to either or both of layers 16 and 20.

The porous material 22 is preferably formed of a spacer fabric (as described above). This spacer fabric has an upper layer of netting 38 and a lower layer of netting 40 supported by a middle layer comprised of plurality of semi-rigid threads 42. Threads 42 extend between upper netting 38 and lower netting 40. The porous material 22 is strong enough to provide a cushion for the occupant while ensuring airflow in all directions, i.e., laterally and longitudinally as well as perpendicular to the netting layers 38 and 40, even when the seat is occupied.

With reference to FIGS. 2, 4, and 5, fan 26 is shown attached to the pad 12 in several different locations. In one preferred embodiment, as shown in FIG. 2, the fan 26 is located in the tongue 24 extending between the occupant's legs. Other embodiments, as shown in FIGS. 4 and 5, show fan 26 under or to the side of a lower seat cushion 44. Specifically, FIG. 4 shows a vehicle seat cushion 44 and a seat back 45 provided with pad 12. Attachment of the fan 26 to the pad 12 is through the bite line of the seat in FIG. 4 and between an inboard bolster (not shown) and a center console (not shown) in FIG. 5. A quick connect for electrical wiring 27 to the fan 26 may be provided. Fan 26 may, for example, be powered by plugging wire 27 into a conventional cigarette lighter provided in vehicles or the wire 27 may be hard wired to the vehicle electrical system.

As best shown in FIGS. 1–3, the vehicle seat pad assembly 10 of the present invention pulls cabin air of the vehicle through the occupant's clothes and porous upper surface layer 14 when the fan is activated in a suction made. Ventilation holes 32 provide patterned openings for pulling the air away from upper surface layer 14 through the first inner layer 16. Air then passes through the spacer material 22. Lower surface area 20 (or upper layer 16 or both) seals about the entrance to fan 26.

The coupling to fan 26 may include a separate non-air permeable seal 50, which in turn is coupled to one or both of the air impermeable layers.

As fan 26 draws air away from the occupant or forces air into pad 12, air speed may be controlled by any suitable fan speed switch, e.g., at high, medium or low speeds.

The foregoing discussion describes preferred and alternate embodiments of the invention. One skilled in the art will readily recognize from such discussion and from the accompanying drawings and claims that changes and modifications can be made to the invention without departing from the true spirit and fair scope of the invention.

What is claimed is:

1. A ventilated vehicle seat comprising:
    a first portion having at least one edge comprising:
        a porous upper surface layer;
        a non-porous first inner layer adjacent to the upper surface layer and including ventilation holes;
        a non-porous lower surface layer; and
        an expanded spacer layer between the non-porous layers providing an air space; and
    a tongue portion comprising a tongue integrally-formed with the first portion and extending from the edge of the first portion and including an opening in one of the non-porous layers, the opening providing access to the air space within the expanded spacer layer.

2. The ventilated vehicle seat of claim 1, wherein the first portion comprises a front edge, two side edges, and a rear edge.

3. The ventilated vehicle seat of claim 2, wherein the edge from which the tongue extends is the front edge of the first portion.

4. The ventilated vehicle seat of claim 2, wherein the edge from which the tongue extends is one of the two side edges of the first portion.

5. The ventilated vehicle seat of claim 2, wherein the edge from which the tongue extends is the rear edge of the first portion.

6. The ventilated vehicle seat of claim 1, further comprising a fan coupled to the opening in the tongue and having access to the air space of the expanded spacer layer.

7. The ventilated vehicle seat of claim 6, wherein the tongue supports the fan.

8. The ventilated vehicle seat of claim 7, wherein the tongue at least partially encloses the fan.

9. The ventilated vehicle seat of claim 8, further comprising a sound absorbing material at least partially surrounding the fan.

10. The ventilated vehicle seat of claim 6, further comprising a non-air permeable seal coupling the fan to at least one of the non-porous layers.

11. The ventilated vehicle seat of claim 6, wherein the tongue extends from the edge of the first portion such that the fan is spaced apart from the edge of the first portion.

12. The ventilated vehicle seat of claim 11, wherein the tongue is configured to allow the fan to be placed below the vehicle seat.

13. The ventilated vehicle seat of claim 6, wherein the fan is coupled to the opening in the tongue such that the operation of the fan draws air through the ventilation holes and out from the air space within the expanded spacer layer.

14. The ventilated vehicle seat of claim 6, wherein the fan is coupled to the opening in the tongue such that the operation of the fan draws air into the air space within the expanded spacer layer and out of the ventilation holes.

15. The ventilated vehicle seat of claim 1, wherein the first portion has a first width and the tongue has a second width, the second width being less than the first width.

16. The ventilated vehicle seat of claim 1, wherein the first inner layer is coupled to the lower surface layer to form an air impermeable bag.

17. A ventilated seat pad assembly for a vehicle seat comprising:
- a first portion including at least one side having a first width comprising:
  - at least two non-porous layers;
  - an expanded spacer layer between the two non-porous layers providing an air space; and
  - ventilation holes in at least one of the non-porous layers;
- a tongue extending from the side of the first portion and having a second width less than the first width, the tongue comprising an extension of the at least two non-porous layers and an extension of the expanded spacer layer and including an opening in one of the non-porous layers, the opening providing access to the air space within the expanded spacer layer; and
- a fan operatively coupled to the opening in the tongue and having access to the air space of the expanded spacer layer.

18. The ventilated seat pad assembly of claim 17, wherein the tongue supports the fan.

19. The ventilated seat pad assembly of claim 18, wherein the tongue comprises a pocket to support the fan.

20. The ventilated seat pad assembly of claim 19, further comprising a sound-absorbing material at least partially surrounding the fan.

21. The ventilated seat pad assembly of claim 17, further comprising a porous layer adjacent one of the non-porous layers.

22. The ventilated seat pad assembly of claim 17, wherein the at least two non-porous layers are coupled together to form an air impermeable bag.

23. A ventilated seat pad assembly for a vehicle seat comprising:
- a first portion comprising:
  - a first non-porous layer;
  - a second non-porous layer;
  - an expanded spacer layer between the first and second non-porous layers providing an air space; and
  - ventilation holes in one of the first and second non-porous layers;
- a tongue extending from the first portion, the tongue comprising an extension of the first and second non-porous layers and including an opening in one of the non-porous layers, the opening providing access to the air space within the expanded spacer layer; and
- a fan coupled to the opening in the tongue and having access to the air space of the expanded spacer layer.

24. The ventilated seat pad assembly of claim 23, wherein the tongue further comprises an extension of the expanded spacer layer.

25. The ventilated seat pad assembly of claim 23, further comprising a porous layer adjacent one of the first and second non-porous layers.

26. The ventilated seat pad assembly of claim 25, wherein the tongue further comprises an extension of the porous layer.

27. The ventilated seat pad assembly of claim 23, wherein the first non-porous layer is coupled to the second non-porous layer to form an air impermeable bag.

28. A ventilated seat pad comprising:
- a porous outer surface layer;
- a non-porous material including
  - a first inner layer adjacent to the outer surface layer and including a plurality of ventilated holes; and
  - a lower surface layer;
- an expanded spacer material between the layers of the non-porous material, the expanded spacer material being formed of spacer fabric having an upper and a lower layer of netting and a middle layer of threads extending between said upper and lower netting layers; and
- a tacky layer between the expanded spacer material and a portion of the non-porous material, wherein the tacky layer minimizes movement of the expanded spacer material relative to the non-porous material.

29. The ventilated seat pad of claim 28 wherein the tacky layer is between the expanded spacer material and the lower surface layer.

30. The ventilated seat pad of claim 28 wherein the first inner layer comprises a foam layer laminated to a continuous resin film layer.

31. The ventilated seat pad of claim 28 further comprising a tongue integrally formed with at least one of the first inner layer, the lower surface layer, and the expanded spacer material.

32. The ventilated seat pad of claim 31, further comprising a fan operatively coupled to an opening in the tongue for forcing air through or drawing air from the ventilation holes in the first inner layer through the expanded spacer material.

33. The ventilated seat pad of claim 28 further comprising a tongue integrally formed with the first inner layer, the lower surface layer, and the expanded spacer material.

34. The ventilated seat pad of claim 28, wherein the first inner layer is coupled to the lower surface layer to form an air impermeable bag.

* * * * *